May 17, 1966   W. A. PULLIAM   3,251,494
SUPPORT MEANS FOR VEHICLE MOUNTED STRUCTURES
Filed May 11, 1964   2 Sheets-Sheet 1
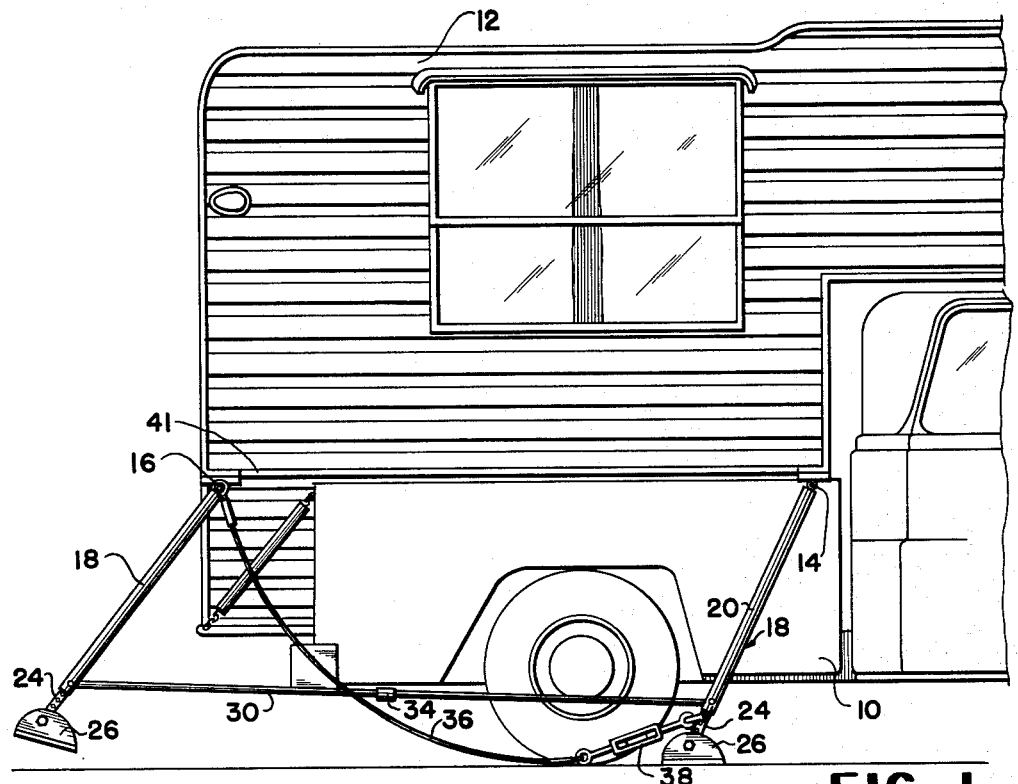
FIG. 1
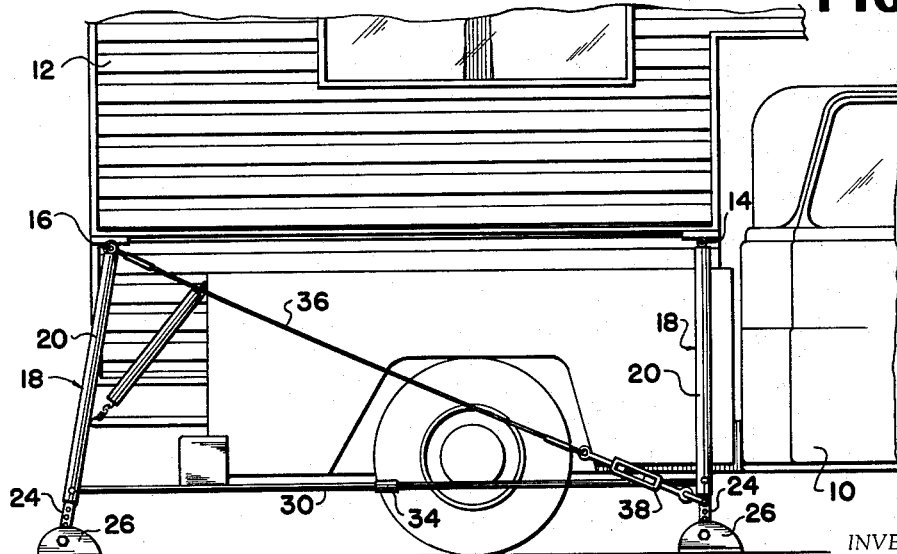
FIG. 2
INVENTOR.
WILLIAM A. PULLIAM
BY 
ATTORNEY May 17, 1966  W. A. PULLIAM  3,251,494
SUPPORT MEANS FOR VEHICLE MOUNTED STRUCTURES
Filed May 11, 1964  2 Sheets-Sheet 2

INVENTOR.
WILLIAM A. PULLIAM
BY John H. Widdowson
ATTORNEY

3,251,494
SUPPORT MEANS FOR VEHICLE MOUNTED STRUCTURES
William A. Pulliam, Clearwater, Kans.
Filed May 11, 1964, Ser. No. 366,306
4 Claims. (Cl. 214—354)

The present invention relates to a hand truck, more particularly to a portable hand truck comprising a notched and ramped load carrying platform, a plurality of independently adjustable load engaging means adapted to be positioned to retain a load of either uniform or non-uniform configuration on the hand truck, and a resilient material covering portions of the hand truck contacting the load.

Several portable hand trucks are presently available to transport loads. However, these several portable hand trucks utilize either no load engaging means or load engaging means that are not independently adjustable thereby limiting the types of load configurations the hand truck can carry. In addition these several hand trucks do not have a ramped and notched load carrying platform that facilitates the positioning of a load and the retention of the load at a predetermined location on the hand truck. Also these several presently available hand trucks have no ostensible means of protecting the surfaces of the load from possible disfigurement by engagement with the various retaining surfaces of the hand truck.

In contradiction thereto the portable hand truck of the present invention is utilized as a means and method of transporting loads of a variety of configurations without altering or marring the several surfaces of the load that engage the several surfaces of the hand truck. The notched and ramped load carrying platform and the independently adjustable load engaging means facilitate the positioning and the retention of the load at the most advantageous location on the hand truck. A combination ramp and notched load carrying platform facilitates the initial placement of the load on the hand truck and the retention thereon.

It is an object of the present invention to provide a novel hand truck having independently adjustable load engaging means to facilitate the transportation of loads having either standard or awkward configurations.

Another object of the present invention is to provide a transportation means having means engaging the load sheathed with a resilient material so as to protect the load from disfigurement by the non resilient character of the means engaging the load.

Still another object of the present invention is to provide a hand truck that is simple to fabricate and easy to assemble.

Yet another object of the present invention is to provide a hand truck having adjustable load engaging means, the means including a clamping means for positioning and retaining the means at any one of a plurality of locations.

A further object of the present invention is to provide a hand truck having a combination ramped and notched load carrying platform that simplifies the initial positioning and assures retention of the load on the hand truck.

Still another object of the present invention is to provide a hand truck that is inexpensive and sturdy in construction.

Yet another object of the present invention is to provide a hand truck that includes at least two load engaging means, each means including a hand operated locking means that retains its associated arm in a desired position with respect to a load.

The present invention in another of its aspects, relates to novel features of the instrumentalities of the invention described therein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, the appended claims, and the appended drawing. The invention resides in the novel construction, combination, arrangement, and cooperation of elements as hereinafter described and more particularly as defined in the appended claims.

The appended drawing illustrates the preferred embodiments of the present invention constructed to function in the most advantageous modes devised for the practical application of the basic principles involved in the hereinafter described invention.

In the drawing:

FIGURE 1 is a perspective view of the present invention illustrating the novel means utilized to retain a load, the load shown as a dotted line.

FIGURE 2 is a front view of the present invention shown in FIGURE 1.

Figure 3:
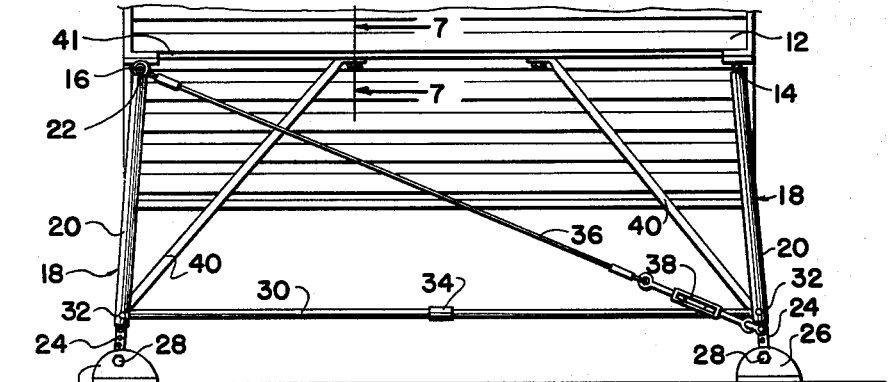
FIGURE 3 is a side view of the present invention illustrated in FIGURE 1.

Generally speaking, the present invention pertains to a means and method of manually transporting loads of awkward as well as standard configuration. More particularly the present invention is directed toward a novel hand truck. The hand truck of the present invention comprises two C-shaped frame members and a plurality of cross bars fixedly coupled to the frame members thereby maintaining the frame members in spaced, parallel relationship. A unitary load retaining plate means overlies the plurality of cross bars to provide a back rest against which the load can rest. A wheel is coupled to each of the frame members providing a means and method of providing mobility to the hand truck. A handhold means is fixedly coupled to the upper extremity of each of the frame members. A notched and ramped load carrying platform means is fixedly coupled to the lower extremity of each of the frame members and is fixedly coupled to the lowermost cross bar. The platform means projects outwardly from the frame members. The ramped portion of the load carrying platform facilitates the initial placement of the load on the hand truck or the removal of the load from the platform of the hand truck. The notched portion centrally located on the platform serves not only as a locating seat for a load but in addition as a retaining means for a load having curved sides. A plurality of independently adjustable load engaging means are utilized to aid in the retention of a load on the hand truck. At least one adjustable load engaging means slidably interfits with one of the C-shaped frame members. The load engaging means interfits with the channel portion of the frame members. The load engaging means is comprised of an integrally coupled adjustable clamping means and a load engaging arm. The adjustable clamping means engages the channel of the C-shaped frame member to retain the load engaging arm at any one of a plurality of predetermined positions along the C-shaped frame member. Resilient means such as rubber, sheath the surfaces of the platform means, the load engaging means, and the load retaining plate means that engage the load to thereby protect the load from possible disfigurement from the load contacting any one of the aforementioned surfaces.

Referring now to FIGURES 1–5 of the drawing which illustrate the preferred embodiment of the present invention comprising a hand truck 10 carrying thereon a simulated, awkward load 18. To facilitate the description of the novel components of the hand truck, load 18 has been illustrated in broken lines. The hand truck is a substantially rectangular shaped means comprised of a pair of elongated frame members 11 and 12. The cross section of each of the frame members is substantially C-shaped. It is understood that the frame members may be fabricated from any suitable material such as steel or the like and could have any suitable cross sectional configuration such as tubular or the like. A plurality of cross bars 35 fixedly connect the pair of frame members 11 and 12 in spaced, parallel relationship. It is seen that the location of the cross bars are such that each bar affords maximum sturdiness to the hand truck as a whole and to the frame members in particular. The area of the truck bounded by the uppermost and the lowermost cross bar members and the parallel frame members is covered by a flat plate 37 fabricated of wood. The wood plate is sheathed by a resilient material 33 such as rubber or the like. The resilient material protects a load engaging the resilient sheathing from being possibly marred by the cross bars and/or the frame members of the hand truck.

A flange 20 is perpendicular to each of the respective frame members and is fixedly coupled thereto by any suitable means such as by welding, by riveting or the like. A shaft (not shown) projects through an aperture in each flange and thereby utilizes each flange as a support means. The combination of the two flanges and the shaft provides a means for mounting a wheel 19 juxtaposition each of the flanges 20. The wheels afford the hand truck mobility that an individual can impart to the hand truck without the aid of additional mechanical devices.

A ramped and notched load carrying platform 15, fabricated of steel or other suitable material, is fixedly coupled to the cross bar 35 that couples the lower extremities of the respective frame members and to the lower extremities of the respective frame members. The platform is coupled thereto by any suitable means such as by welding or the like. The platform projects outwardly from the frame members thereby providing a seat for load 18. It is seen that the sides of the platform perpendicular to the longitudinal axis of the platform are inclined or ramped to facilitate the initial placement of the load on the hand truck or the removal of the load from the platform of the hand truck. A notch 16 extending thwartwise the platform and centrally located thereon serves not only as a locating seat but also as a retaining means for awkward loads such as wheels or the like. The upper surface of the platform, the surface engaging the load, is sheathed or covered with a resilient material 17 such as rubber or the like. The resilient material prevents the possibility of disfigurement of the load due to the non-resilient character of the platform.

The respective frame members have fixedly coupled to their upper extremity a handhold 22. The handholds provide a means whereby an individual can easily grasp the hand truck and impart mobility thereto in any one of several directions.

Figure 4:
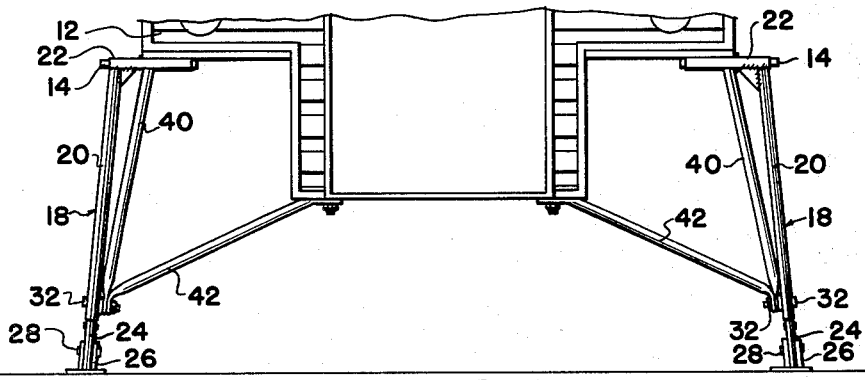
FIGURE 4 is a perspective view of the load engaging arm and associated clamping means of the present invention.
Figures 5, 6, 7:
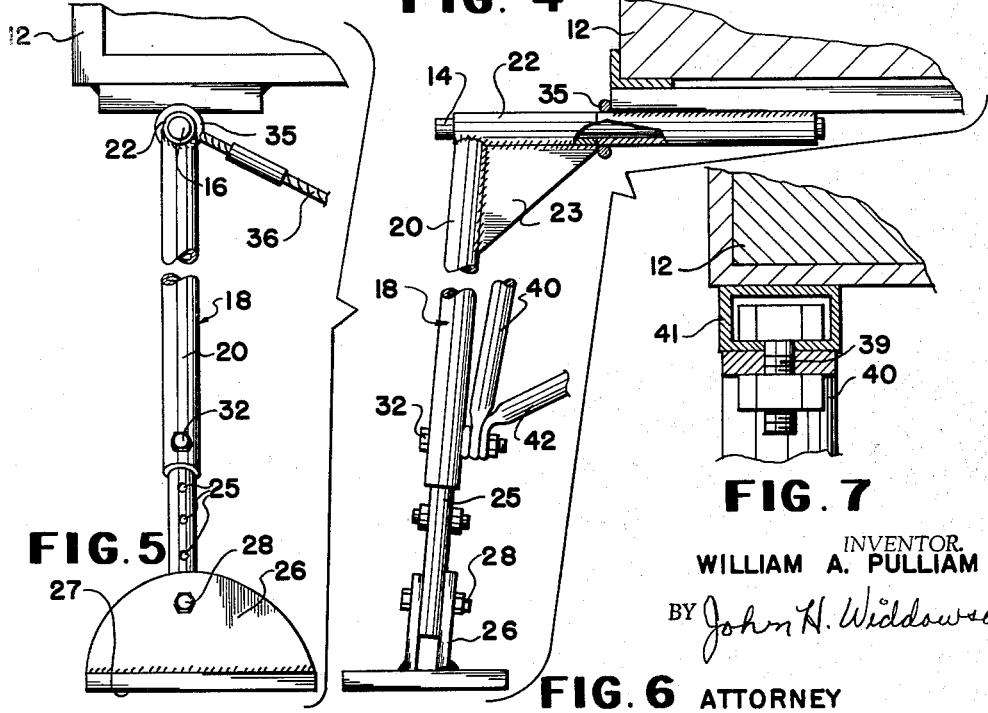
FIGURE 5 is a cross sectional view of the present invention taken along the lines of 5—5 of FIGURE 4.

Independently adjustable load engaging means 13 and 14 slidably interfit with the channel portion of C-shaped frame members 11 and 12 respectively. FIGURE 1 illustrates the slidable interconnection between the load engaging means and the C-shaped frame members. FIGURE 4 shows the components comprising the load engaging means, the load engaging means comprised of clamping means 34 and load engaging arm 38. A substantially T-shaped bar means is so formed so as to interfit with the channel portion of the C-shaped frame member. Fixedly coupled to an extremity of the T-shaped bar member and perpendicular to the longitudinal axis thereof is cylindrical shaped load engaging arm 38. Fixedly coupled to the recessed face 27 of the stem portion of the T-shaped bar member is bolt 28. A plate 29, having a centrally located aperture 30, is located so as to overlie face 27 with bolt 28 projecting through the aperture in the plate. A lever means 32 including an extremity terminating in threaded nut means 31 is located so that the threaded nut means mates with threaded bolt 28. As lever 32 is manually rotated in a clockwise direction, plate 29 is displaced toward face 27 by nut means 31 which traverses the longitudinal axis of the bolt means toward face 27. As the lever 32 is manually rotated in a counterclockwise direction, the nut means traverses the longitudinal axis so as to be displaced further from face 27 thereby permitting plate 29 to be displaced from face 27 if so desired. A recess 36 is cut into load engaging arm 38 so that the C-shaped frame member underlies a portion of the arm thereby allowing the arm to more closely communicate with load 18. The portions of the load engaging arm most likely to contact a load are sheathed with a resilient material 23 such as rubber or the like to protect the load from possible marring by the non-resilient character of the load engaging arms.

Assuming that the independently adjustable load engaging means are positioned as shown in FIGURE 1 and that it is desired to displace only load adjusting means 14 to a more elevated position while load adjusting means 13 is maintained in its present position, the operator rotates lever means 32 of the clamping means 34 in the counterclockwise direction thereby releasing the pressure between the T-shaped bar and the channel of the C-shaped frame member and releasing the pressure between plate 27 and the C-shaped frame member. With this movement of the lever, load engaging means 14 may be displaced upwardly in the channel to a desired position with respect to the load. Upon attaining desired position, lever means 32 is displaced clockwise thereby causing threaded nut means 31 to be displaced toward surface 27. In so doing T-shaped bar 24 engages the channel portion of the C-shaped frame member 12 and plate 29 engages the C-shaped member thereby effectively clamping load engaging means in a desired position.

To lower the load engaging means 24 the procedure as disclosed hereinbefore is followed with the exception that the load engaging means is displaced downwardly in lieu of being displaced upwardly. It is seen that load engaging means 13 may be displaced and locked in any predetermined position in the chamber of frame member 11 utilizing the procedure disclosed in conjunction with the disclosure of the operation and placement of load engaging means 14 in the channel of frame member 12.

While the invention is illustrated and described in its preferred embodiment, it will be understood that modifications and variations may be effected without departing from the scope of the novel concepts of this invention as set forth in the appended claims.

Having thus described my invention, I claim:

1. A hand truck comprising: C-shaped frame members; a plurality of cross bars fixedly coupled to said frame members and maintaining said frame members in spaced, parallel relationship; a unitary load retaining plate means overlying said plurality of cross bars; a wheel coupled to each of said frame members providing mobility to said hand truck; handhold means fixedly coupled to the upper extremity of each of said frame members; a notched and ramped load carrying platform means fixedly coupled to the lower extremity of each of said frame members, said platform means projecting outwardly from said frame members; a plurality of independently adjustable load engaging means, at least one of said load engaging means slidably interfitting with a channel portion of said C-shaped frame member, said load engaging means comprising an integrally coupled load engaging arm means and an adjustable clamping means, said clamping means engaging said channel of said C-shaped frame member to retain said load engaging arm at any one of a plurality of predetermined positions along said C-shaped frame members; and resilient means sheathing surfaces of said platform means, said load engaging means, and said load retaining plate means that engage said load thereby protecting said load from disfigurement by any of said means.

2. A hand truck comprising: C-shaped frame members; a plurality of cross bars fixedly coupled to said frame members and maintaining said frame members in spaced, parallel relationship; a plate means overlying said plurality of cross bars; a wheel coupled to each of said frame members providing mobility to said hand truck; handhold means fixedly coupled to the upper extremity of each of said frame members; a load carrying platform means fixedly coupled to the lower extremity of each of said frame members, said platform means projecting outwardly from said frame members; a plurality of independently adjustable load engaging means, at least one of said load engaging means slidably interfitting with a channel portion of said C-shaped frame member, said load engaging means comprising an integrally coupled load engaging arm means and an adjustable clamping means; and resilient means sheathing surfaces of said platform means, said load engaging means, and said load retaining plate means that engage said load thereby protecting said load from disfigurement by any of said means.

3. A hand truck comprising: C-shaped frame members; a plurality of cross bars fixedly coupled to said frame members and maintaining said frame members in spaced, parallel relationship; a unitary load retaining plate means overlying said plurality of cross bars; a wheel coupled to each of said frame members providing mobility to said hand truck; handhold means fixedly coupled to the upper extremity of each of said frame members; a notched and ramped load carrying platform means fixedly coupled to the lower extremity of each of said frame members, said platform means projecting outwardly from said frame members; and a plurality independently adjustable load engaging means, at least one of said load engaging means slidably interfitting with a channel portion of said C-shaped frame member, said load engaging means comprising an integrally coupled load engaging arm means and an adjustable clamping means, said clamping means engaging said channel of said C-shaped frame member to retain said load engaging arm at any one of a plurality of predetermined positions along said C-shaped frame member.

4. A hand truck comprising: C-shaped frame members; a plurality of cross bars fixedly coupled to said frame members and maintaining said frame members in spaced, parallel relationship; a load retaining plate means overlying said plurality of cross bars; a wheel coupled to each of said frame members providing mobility to said hand truck; handhold means fixedly coupled to the upper extremity of each of said frame members; a notched and ramped load carrying platform means fixedly coupled to the lower extremity of each of said frame members, said platform means projecting outwardly from said frame members; a plurality of adjustable load engaging means, at least one of said load engaging means slidably interfitting with a channel portion of said C-shaped frame member, said load engaging means comprising an integrally coupled cylindrical load engaging arm means and an adjustable clamping means, said clamping means engaging said channel of said C-shaped frame member to retain said load engaging arm at any one of a plurality of predetermined positions along said C-shaped frame member; and resilient means sheathing surfaces of said platform means, said load engaging means, and said load retaining plate means that engage said load thereby protecting said load from disfigurement by any of said means.

References Cited by the Examiner

UNITED STATES PATENTS

| | | | |
|---|---|---|---|
| 342,978 | 6/1886 | Smith | 214—377 |
| 349,665 | 9/1886 | Rose | 214—383 |
| 1,795,812 | 3/1931 | Whiting | 214—370 |
| 1,921,661 | 8/1933 | Conner. | |
| 3,081,892 | 3/1963 | Cook | 214—371 |
| 3,155,256 | 11/1964 | Cook | 214—371 |

GERALD M. FORLENZA, *Primary Examiner.*